United States Patent [19]

Everly et al.

[11] 3,943,277

[45] Mar. 9, 1976

[54] DIGITAL MEMORY AREA CORRELATION TRACKER

[75] Inventors: John W. Everly, Fort Walton Beach, Fla.; Barry S. Todd, Corona, Calif.

[73] Assignee: The United States of America as represented by the Secretary of the Navy, Washington, D.C.

[22] Filed: Feb. 20, 1969

[21] Appl. No.: 802,328

[52] U.S. Cl. ......... 178/6.8; 178/DIG. 21; 244/3.17; 250/203 CT
[51] Int. Cl.² .......................................... H04N 3/00
[58] Field of Search ..... 244/3.17; 178/6.8, DIG. 21; 250/203 CT

[56] References Cited
UNITED STATES PATENTS
3,372,890   3/1968   Bogard et al. ..................... 244/3.17
3,416,752   12/1968   Hembree ........................... 244/3.17

Primary Examiner—Maynard R. Wilbur
Assistant Examiner—S. C. Buczinski
Attorney, Agent, or Firm—R. S. Sciascia; G. J. Rubens; T. M. Phillips

[57] ABSTRACT

A digital tracker which provides a continuous display of the area tracked comprising a delay line coupled in circuit with a comparator, a video digitizer and a sensor. The digital tracker further comprises circuit means connected between the delay line and the sensor for deriving an error correction signal in response to any mismatch between the present, delayed video scene and the reference scene, stored in the delay line. A staircase raster generator which can be positively synchronized with the delay line through the use of a common master clock is used as the sensor and the delay line is a shift register which enables any desired bit of the stored signal to be available for use at any time.

6 Claims, 1 Drawing Figure

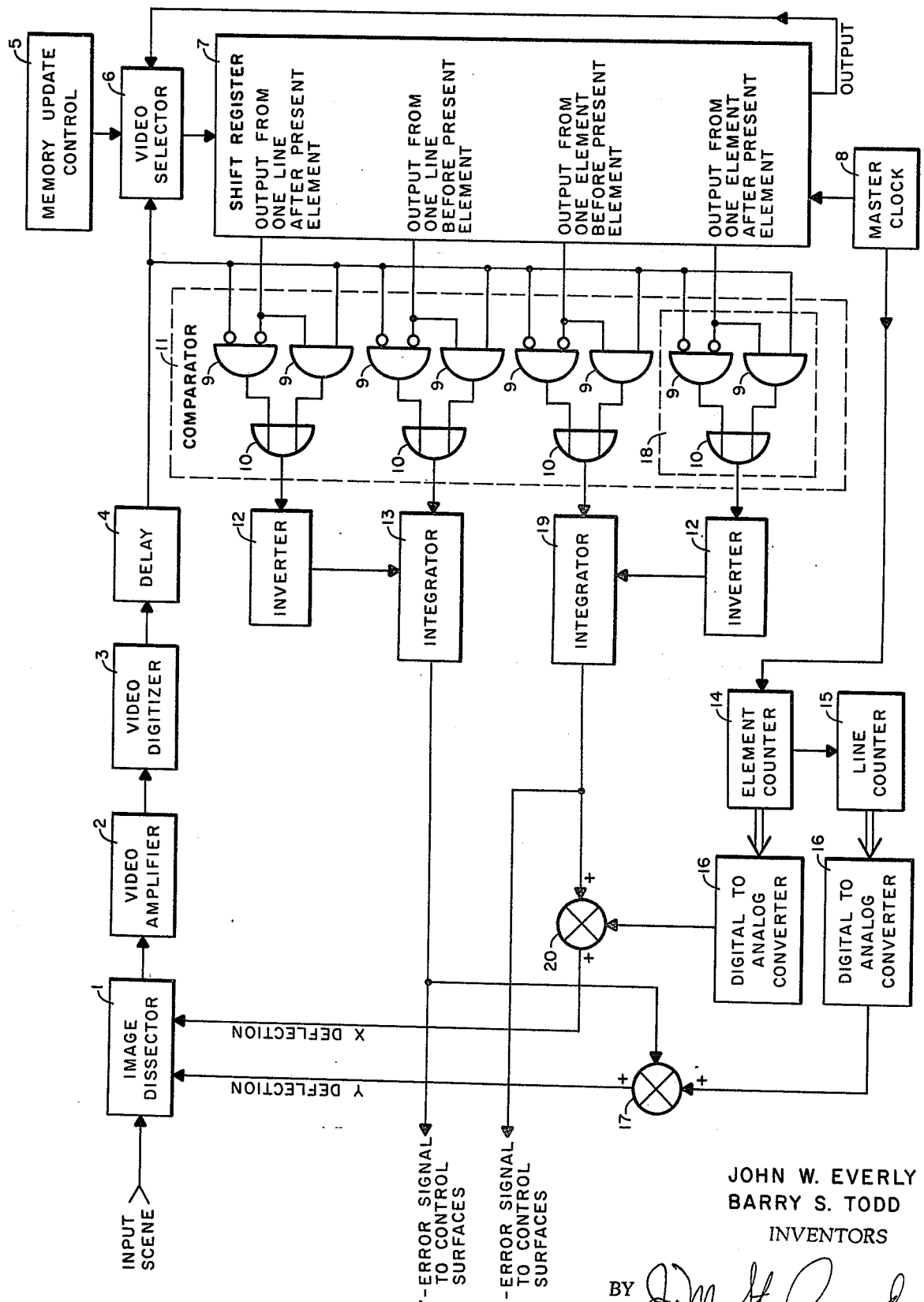

DIGITAL MEMORY AREA CORRELATION TRACKER

The invention herein described may be manufactured and used by or for the Government of the United States of America for governmental purposes without the payment of any royalties thereon or therefor.

BACKGROUND OF THE INVENTION

1. Field of the Invention

The purpose of this invention is to provide a digital memory area correlation tracking device with continuous television display of the tracked area. In particular it is intended to provide a device for supplying information on the displacement of a scene with respect to its original position as viewed from a sensor such as a television camera, radar, or other sensing device and to provide means for reducing this displacement to zero.

2. Description of the Prior Art

A multiplicity of tracking devices working on electro-optical principles are known. They can be divided into two types: systems tracking an isolated point of the scene which exhibits characteristics different from its surroundings; and systems which use information from sources other than the point tracked. The first type of systems requires that the point to be tracked is sufficiently different from the background and that its characteristics are not subject to rapid, random change; this type of system will consequently fail if the noise level in the system exceeds the difference between the target and its surroundings. The second type of system has various embodiments. One of these embodiments requires a photographic positive or negative to be correlated with the actual scene. The need for the photographic reference is clearly a disadvantage in systems employed against targets which cannot be pre-determined. Another embodiment requires an annular ring of information from around the target to be stored in a memory and correlated against sequential information obtained from the sensing device. In such a system it is extremely difficult to obtain an accurately boresighted television image of the target scene and to determine the actual aim point of the system. Furthermore, a change in aim point in such a system requires that the tracking operation be interrupted and that a new reference signal be stored. Still another embodiment requires a television signal to be stored in analog form in an electron beam storage tube. The stored signal is read out of the storage tube with the same scan signals as it was read in, but an additional scan is added. The read-out signal is then compared in analog form with the new signal from the camera and the resultant signal is then delayed and gated to produce an error signal for correcting the line of sight. The necessity of a storage tube in this system results in many noise disadvantages.

SUMMARY OF THE INVENTION

The present invention concerns a digital tracker which provides a continuous display of the area tracked. The video signal is digitized into two levels (a digital "one" and a digital "zero") and stored in a delay line which is a shift register. The use of the shift register makes any desired bit of the stored signal available for use at any time. The delay line may be tapped to provide signals for the elements positioned above, below, and to both sides of any desired element in the stored video scene, and all of the elements are correlated with the input signal to form correction signals. A staircase raster generator is used for the television sensor which can be positively synchronized with the shift register through the use of a common master clock. As a result, since the entire system is synchronous, changes in clock frequency do not affect accuracy and, therefore, various clock rates can be tried without the necessity for changes in the system. A further advantage of the present invention resulting from the use of a shift register is that both advanced and delayed stored video information are available and the respective length of this information can be opportioned in any integer number of resolution elements. This is accomplished by physical connection and not dependent on time as in a conventional delay line.

BRIEF DESCRIPTION OF THE DRAWINGS

Many other attendant advantages of this invention will become readily appreciated as the same becomes better understood by reference to the following detailed description when considered in connection with the accompanying drawing wherein:

The FIGURE is a block diagram showing the circuit of the present invention.

DESCRIPTION OF THE PREFERRED EMBODIMENT

Referring to the FIGURE of drawings, a sensor such as an image dissector 1 is connected to a video amplifier 2, which in turn, is connected to a video digitizer 3. An image dissector 1 is used as the sensor because it can be scanned in a random manner without variation in gain resulting from the length of time since a given spot was last scanned. Any other sensor similarly capable of being randomly scanned can be used.

It has been found that the device of the present invention will work if the output from the image dissector 1 is fed directly to the video digitizer 3. However, as a practical matter, a video amplifier 2 is placed between these components to strengthen the output from the image dissector 1. The video amplifier 2 can also comprise automatic gain control means for holding the output amplitude of the image dissector 1 at a predetermined level over a given range of scene illumination levels.

If it is desired to have a continuous display of the input to the sensor 1, a TV monitor can be connected in the circuit directly behind the video amplifier.

The video digitizer 3, which can be an overdriven, limiting amplifier which provides a digital "one" when the instantaneous video is greater than its average and a digital "zero" when it is less, is connected to a delay circuit 4. The delay circuit 4 is further connected to both a video selector 6 and a comparator 11. A memory update control 5, which can be a simple toggle switch, is connected to the video selector 6 and the video selector 6 is, in turn, connected to the input of a shift register 7. The shift register 7 acts like a synchronized delay line whose delay time depends upon the clock frequency of a master clock 8 which is connected to the shift register 7. The length of delay is some whole number of clock pulses. The shift register 7 contains a raster of elements equal in number to the number of elements in the area scanned and can easily be tapped at any given element so as to give any desired amount of delay. A feedback loop connects the output of the shift register 7 with the video selector 6 so that the output of the shift register 7 can be fed back to the video selector 6 so as to re-circulate the elements in the raster through the shift register 7.

The video selector 6 is a simple digital circuit capable of selecting the input to the shift register 7 from either the delayed live video or the re-circulating output of the shift register 7 in response to the positioning of the memory update control 5. The memory updating control 5 is positioned so as to select the delayed live video when placing the initial scene into the shift register and also when it is necessary or desired to update the scene in the shift register 7 such as to compensate for range closure. At other times, it is positioned so as to select the re-circulating output of the shift register 7. A multiplicity of connections, corresponding to the number of elements to be compared in the raster, connect the shift register to a corresponding multiplicity of coincidence circuits 18 comprising the comparator 11. Each coincidence circuit 18 comprises a pair of "and" logic circuits 9 coupled with an "or" logic circuit 10.

In comparing any element of the stored video scene in the shift register 7, the four output signals from the elements positioned above, below and to both sides of the element being compared are considered. These four output signals and their compliments are used in the comparator together with the processed, delayed video signal from the sensor to derive error signals in the X and Y direction. The four output signals of interest from the shift register 11 correspond to two lines, a vertical line and a horizontal line. The present delayed video signal will match best with one of the four output signals resulting in an error signal which is used to reposition the center of the image tube deflection so that all four outputs match equally well with the present delayed video.

The output sides of those coincidence circuits 18 which correspond to lines in the shift register 7 are grouped together and connected to a first integrator circuit 13 in order to produce the error signal in the Y-direction by taking the analog difference between the outputs of the two coincident circuits. For each present element of video being compared, the processed output from the comparator 11 corresponding to the output from one line after the present element is inverted with respect to the processed output from the comparator 11 corresponding to the output from one line before the present element and the difference of these two outputs is fed to the integrator 13. The integrator 13, in turn, is connected to the pitch control surfaces of the tracking vehicle and to a first adder circuit 17.

Similarly, the output sides of those coincidence circuits 18 which correspond to elements in the shift register 7 are grouped together and connected to a second integrator circuit 19 in order to produce an error signal in the X-direction. For each present element of video being compared, the processed output from the comparator 11 corresponding to the output from one element before the present element is inverted with respect to the processed output from the comparator 11 corresponding to the output from one element after the present element and the difference of these two outputs is fed to a second integrator 19. The integrator 19, in turn, is connected to the yaw control surfaces of the tracking vehicles and to a second adder circuit 20.

The master clock 8 is connected to an element counter 14 which in turn is connected to a line counter 15. The pulses from the master clock 8 are counted in the counters 14, 15 in order to generate the scan signal. The element counter 14 and the line counter 15 are both coupled to digital to analog converters 16 and in turn they are connected respectively to the first adder circuit 20 and to the second adder circuit 17. The counters are respectively set to count to the number of elements desired per line and to the number of lines desired per frame and then to reset to zero. The line counter 14 and the element counter 15 cooperate with the respective digital to analog converters 16 to generate a staircase waveform in the general shape of a sawtooth, the average dc value of which is determined by the input from the respective integrators 13, 12. The error correction signals are combined with the normal scan signals in the adder circuits 17, 20 and then conveyed to the image dissector 1 in order to reduce the tracking displacement to zero.

Different taps on the main shift register can be selected, using a digital selector, which would correspond to larger element spacing in the horizontal and/or vertical direction. Such spacing selection would optimize the entire system for any specific set of properties of the viewed scene.

The selection process could be instantaneous and the element spacing could be varied during the tracking operation.

Two or more comparators could be used, each connected to a set of shift register outputs, and the tracking information would be utilized from the comparator with the better output. Instantaneous comparison and selection would then be possible.

What is claimed is:

1. A digital memory, area correlation tracking device with continuous television display of the tracked area comprising:
   a. a sensor,
   b. a video digitizer coupled to the sensor,
   c. a delay circuit connected to the video digitizer,
   d. a comparator connected in circuit with the delay circuit,
   e. a video selector connected to the delay circuit,
   f. a memory update control connected to the video selector,
   g. a shift register coupled to the video selector and also connected in circuit with the comparator,
   h. scanning means for generating a normal scan of the sensor in circuit with the sensor,
   i. a master clock connected in circuit with both the shift register and the scanning means whereby the shift register and the scanning means are positively syhchronized together, and
   j. integratinig means for modifying the normal scan of the sensor in response to the output of the comparator, connected between the comparator and the sensor.

2. A tracking device as claimed in claim 1 wherein the sensor is an image dissector.

3. A tracking device as claimed in claim 1 further comprising a video amplifier containing automatic gain control means connected in circuit between the sensor and the video digitizer, said video amplifier being operable to strengthen the output from said sensor, and the automatic gain control means therein being operable to hold the output amplitude of said sensor at a predetermined level over a given range of illumination levels for the tracked area.

4. A tracking device as claimed in claim 1 wherein said comparator consists of a multiplicity of coincidence circuits each of which comprises a pair of "and"

logic circuits coupled in circuit with an "or" logic circuit.

5. A tracking device as claimed in claim 1 wherein said shift register comprises a raster of elements equal in number to the number of elements scanned in the sensor.

6. A tracking device as claimed in claim 1 wherein said scanning means comprise:
a. an element counter,
b. a line counter connected in circuit with the element counter so as to be responsive thereto,
c. a first digital-to-analog converter the input side of which is coupled to the element counter and the output side of which is coupled to the sensor, and
d. a second digital-to-analog converter the input side of which is coupled to the line counter and the output side of which is coupled to the sensor.

* * * * *